United States Patent Office 2,834,815
Patented May 13, 1958

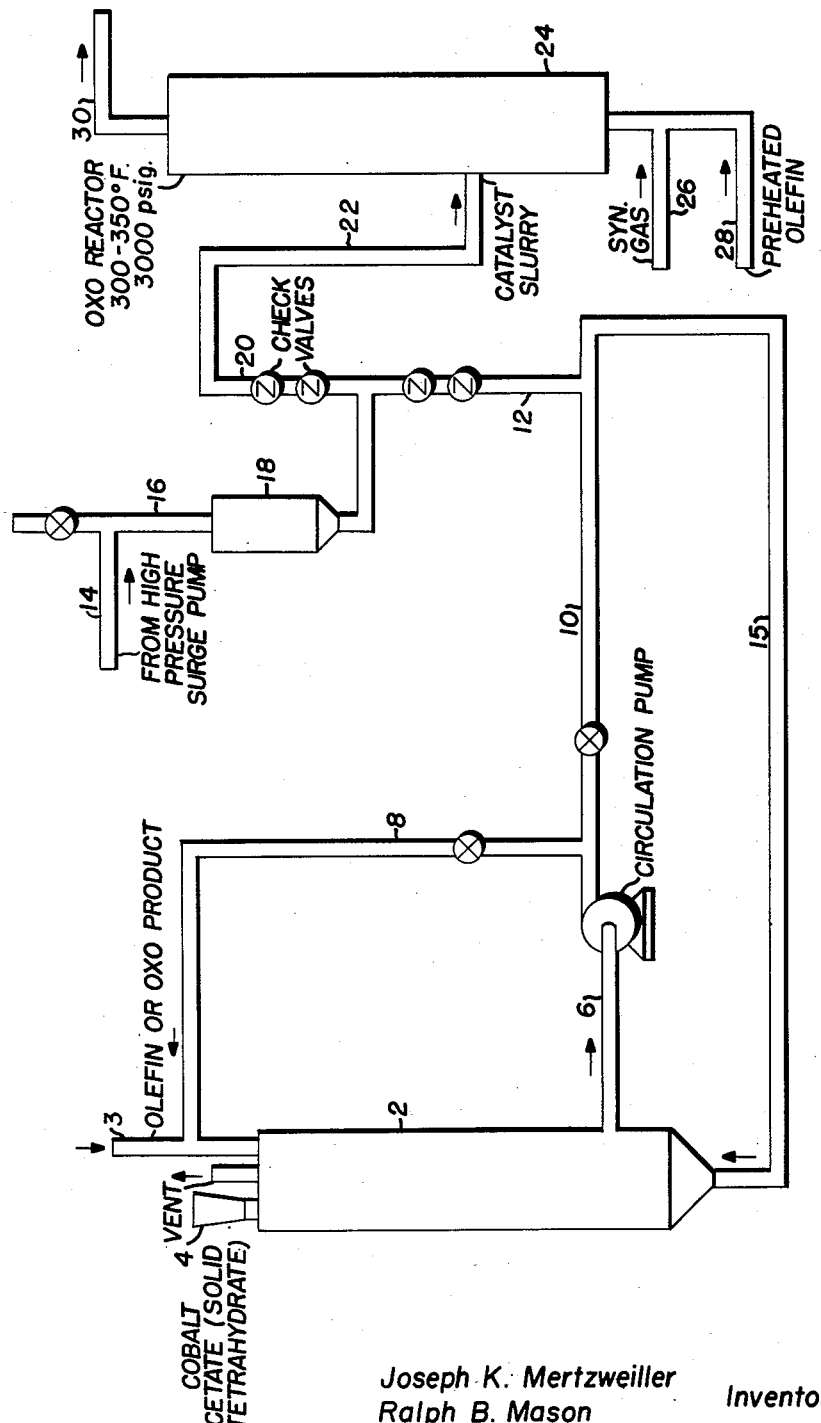

2,834,815

SOLID COBALT ACETATE AS CATALYST FOR OXO SYNTHESIS OF ALCOHOLS

Joseph K. Mertzweiller and Ralph B. Mason, Baton Rouge, La., assignors to Esso Research and Engineering Company, a corporation of Delaware Application April 2, 1954, Serial No. 420,494

8 Claims. (Cl. 260—638)

The present invention relates to the preparation of oxygenated organic compounds by the reaction of carbon monoxide and hydrogen with carbon compounds containing olefinic linkages in the presence of a carbonylation catalyst. More specifically, the present invention relates to a compound particularly adapted to catalyze this reaction.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperaures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and unreacted material are generally withdrawn to a catalyst removal zone where dissolved catalyst is removed from the mixture by thermal treatment in the presence of an inert gas, a vapor, hot water, or dilute acid. Thereafter, the aldehydic reaction product is generally hydrogenated to the corresponding alcohol.

It has been recognized that substantially all forms of cobalt catalyze this reaction, for the active catalytic agent is cobalt hydrocarbonyl in all probability; this compound is synthesized in situ from the cobalt compound or metal originally introduced. However, it has been preferred to employ the compounds of cobalt that are oil-soluble, such as high molecular weight salts of cobalt, i. e. cobalt oleate or naphthenate. These materials form a homogeneous reaction mixture and have a high reactivity or reaction rate, substantially higher than cobalt metal or oxide, or aqueous solutions of cobalt salts, such as cobalt formate or acetate. However, the use of high molecular weight cobalt carboxylates has certain disadvantages. They are expensive to prepare, requiring a variety of processing steps, and also contaminate the final reaction product with the acid or ester corresponding to the carboxylate employed. Furthermore, though the reactivity and reaction rates are high, leading to high olefin conversions, the aldehyde and alcohol selectivity resulting from use of these catalysts is not always satisfactory, and may be somewhat low.

An alternative system is the use of metallic cobalt or slurry of cobalt oxide. These catalytic agents, though they have no residues to contaminate the aldehyde or alcohol product, and though they give a better alcohol selectivity than the oil-soluble cobalt soap, have a very slow reaction rate. This is a very serious defect in continuous operation, for low reaction rates mean low throughput rates.

A third alternative has been the use of aqueous solutions of water-soluble salts, such as cobalt acetate solutions. Here, also, the contamination problem is substantially less than in the case of oil-soluble salts, and alcohol selectivities at a given olefin conversion level are higher than for an equivalent amount of a high-molecular weight cobalt salt. As in the case of the cobalt metal and oxide, the cobalt acetate is also substantially cheaper than the oil-soluble salt, such as the oleate. Thus, the conversion-selectivity relationship for cobalt oleate and cobalt acetate catalysts may be illustrated as follows for equivalent amounts of catalyst. The selectivity values are adjusted to an olefin conversion in the Oxo stage of 75%.

| Catalyst | Addition Technique | Alcohol Selectivity, Percent |
|---|---|---|
| Cobalt Oleate | In olefin solution | 78–79 |
| Cobalt Acetate | In aqueous solution | 87 |
| Do | Solid acetate tetrahydrate | 81 |

Other phases of these data would appear to suggest considerable advantages for using cobalt acetate catalyst over cobalt oleate, besides its 50% greater cheapness. However, though alcohol selectivities are higher, reaction rates of aqueous solutions of cobalt acetate are considerably slower than those of the oil-soluble cobalt salts. In order to add an amount of cobalt acetate equivalent to cobalt oleate to provide the desired cobalt concentration of about 0.3 weight percent, about 5–6 volume percent of water (based on olefin) must be added to the olefin feed. It was found, however, that such a system, i. e., olefin-aqueous cobalt acetate, did not function efficiently, and gave a more unfavorable feed rate vs. olefin conversion relationship than cobalt oleate catalyst at equivalent cobalt concentration. This is illustrated in the following example, where a heptene fraction from a propylene-butylene polymerization unit was continuously carbonylated with 0.3 wt. percent of cobalt catalyst at 340–350° F.

| Catalyst System | Liquid Feed Rate, v./v./Hr. | Conversion, Mol Percent |
| --- | --- | --- |
| Cobalt Oleate in Olefin Solution | 0.6 | 80 |
| Do | 1.2 | 74 |
| Cobalt Acetate in Aqueous Solution | 0.6 | 72 |
|  | 1.2 | 54 |

Thus with the aqueous cobalt acetate catalyst, it is necessary to decrease the olefin feed rate by about 50% to achieve a conversion level equivalent to cobalt oleate.

It is, therefore, an object of the present invention to set forth a process for preparing aldehydes and alcohols from olefins whereby not only high olefin conversions but also high aldehyde and alcohol selectivities are achieved.

It is also a purpose and object of the present invention to set forth a catalyst composition which will achieve the above objectives.

It is a still further object of the present invention to set forth a cheap and readily available catalyst composition adapted to produce high yields of aldehyde and alcohol reaction products at high olefin conversion levels and that is adapted for use in continuous operation.

It has now been found that solid cobalt acetate, and specifically $Co(C_2H_3O_2)_2 \cdot 4H_2O$ uniquely combines the properties of giving high aldehyde and alcohol selectivities at high conversion levels, and thus being peculiarly adapted to employment in a continuous carbonylation operation. It has hitherto been suggested to employ cobalt acetate in aqueous solutions. Though selectivities are good, reaction rates are substantially slower than oil-soluble forms of cobalt, but the differences only stand out clearly in continuous operations. In batch operations in autoclaves, these differences are not at once apparent or recognized unless conditions are especially provided to measure reaction rates.

It has in the past been found that beneficial effects are obtained by adding water to the reaction system in the carbonylation reactor in certain instances. These effects have been in the direction of an increase in reaction product, i. e., alcohol, selectivity. It has now been found, however, that in the case of cobalt acetate that the presence of water substantially decreases the olefin conversion with only slight increase in alcohol selectivity.

The property of producing high alcohol selectivities at high olefin conversion levels is apparently unique with cobalt acetate. As will be shown below, this property is not shared by cobalt solids as such, or even by low molecular cobalt salts or carboxylates as such.

In accordance with the present invention, therefore, solid cobalt acetate, such as the tetrahydrate, is added as a slurry either in the olefin feed or in the product; preferably, however, in the feed. The slurry may be injected into the Oxo reactor by any conventional method of adding a slurry or paste to a system under pressure. Such methods include slurry pumps, paste injectors, surge systems, etc. One embodiment of a system suitable for carrying out the present invention is shown diagrammatically in the figure.

Turning now to the figure, solid cobalt acetate tetrahydrate of suitable particle size is introduced into mixing chamber 2 through hopper 4.

Olefin feed or Oxo product is added to the mixing chamber through line 3 such that the slurry contains from 2 to 10% solids. By means of the circulation pump 6, the slurry is circulated through lines 8, 10 and 15 to both the top and bottom of the mixing chamber. By means of a suitable surge pump liquid olefin or Oxo product is introduced through lines 14 and 16 into surge vessel 18. The system is so designed that except under positive action from the surge pump, the pressure in the surge vessel is sufficiently low to allow slurry to pass through the lower check valves 12. Under positive action from the surge pump, the slurry is forced through the upper check valves 20.

The slurry of cobalt acetate dispersed in the olefin feed or other organic medium, such as recycle aldehyde product or even alcohol distillation bottoms is thus continuously injected into carbonylation reactor 24 through line 22. The slurry which consists of about 0.5 to 3% by weight of cobalt acetate tetrahydrate calculated as cobalt, may be injected at the rate of about 5 to 200 pounds per barrel of olefin, at pressures preferably equal to or slightly higher than those prevailing in reactor 24.

A gas mixture comprising $H_2$ and $CO$ in approximately equal volumes, though 0.5–2 volumes $H_2/CO$ may be used, is supplied through line 26 and flows concurrently with preheated liquid olefin feed admitted through line 28, and with the catalyst slurry. Reactor 24 is preferably operated at pressures of about 2500–3500 p. s. i. g. and temperatures of 300–375° F., depending upon the olefin feed and other reaction conditions.

Liquid feed rates of 0.2 to 2.0 v./v./hour may be employed, which are substantially greater than when aqueous solutions of cobalt acetate, or even anhydrous or water-containing slurries of cobalt metal, cobalt oxide, cobalt carbonate, etc., are employed.

Liquid oxygenated reaction products consisting mainly of aldehydes, containing cobalt carbonyl in solution, as well as unreacted synthesis gases, are withdrawn overhead through line 30 from high pressure reactor 24 and thereafter reacted in a manner now well known in the art, and not forming a part per se of the present invention. Thus, the cobalt contaminated aldehyde product may be freed of cobalt by heating it in the presence of water or dilute acid, in particular dilute acetic acid, and thereafter hydrogenated to the corresponding alcohol. Dilute acetic acid decobalting provides a particularly advantageous method for recovering the catalyst as cobalt acetate directly. It is desirable to degas the aldehyde product prior to acetic acid decobalting if it is desired to recover cobalt as cobalt acetate solution. The latter is thereafter evaporated to recover the cobalt salt as the solid tetrahydrate.

The process of the present invention may be further illustrated by the following specific examples.

*Example 1*

This example describes the technique employed in studying the reaction rates.

The olefin feed and catalyst, either as a solid or in solution are charged to a stainless steel shaker autoclave. The charge is adjusted to the size of the autoclave such that there will always be a substantial excess of synthesis gas and that temperature can be controlled. In general, the liquid charge and catalyst occupy 15–30% of the volume of the vessel. The vessel is sealed, purged several times with synthesis gas, and tested for pressure tightness at a pressure near the desired operating value. After reducing pressure to a low level, about 200 pounds, the contents of the vessel are brought to the desired temperature and the synthesis gas pressure is then increased to the maximum operating value, generally 2500–3500 pounds. Depending upon the nature of the feed and catalyst, an induction period ranging from a very few minutes to several hours may be observed. There is little or no gas consumption as indicated by pressure drop during the induction period. Once reaction starts, a steady decrease in pressure takes place and the pressure is allowed to decrease from its original value to not less than 1700 pounds. The reaction is relatively insensitive to pressure in the range of 1700–3500 pounds. It is preferable to choose catalyst concentrations such that the reaction takes place under essentially constant temperature. The reaction is allowed to proceed until sufficient gas is absorbed to convert at least 50–60% of the olefin, repressuring, if necessary. It is preferable to obtain a pressure-time chart from a continuous pressure recorder. From this record, several points on an olefin conversion-reaction time correlation can be calculated from the gas laws and the free volume of the reactor. Calculations should never go beyond 70% conversion of olefin. The data thus obtained represent a first order reaction and a plot of the logarithm of a function of the unconverted olefin concentration against time is linear. From the slope of the line, the conventional first order reaction rate constant may be calculated. These rate calculations are quite reproducible at constant temperature and catalyst concentration.

*Example II*

In the example below, the reaction rate constants $k \times 10^2$ were determined, in the manner described in the foregoing example, for a series of cobalt-containing solids and solutions. The reaction rate constants were determined at 0.2% cobalt equivalent with a heptene fraction prepared by copolymerizing propylene and butylenes on a $P_2O_5$ kieselguhr catalyst.

| Catalyst | Temperature, °F. | Induction Period, Min. | Reaction Rate Catalyst, Min., $k \times 10^2$ |
|---|---|---|---|
| Cobalt Oleate | 300 | 81 | 2.1 |
| Cobalt Carbonyl | 300 | None | 2.0 |
| Cobalt Acetate Solution (7% water on olefin) | 300 | >60 | 0.2 |
| Cobalt Acetate Solid ($4H_2O$) | 300 | 10 | 1.7 |
| Cobalt Oleate | 340 | 30 | 6.5 |
| Cobalt Acetate Tetrahydrate | 340 | 10 | 3.2 |
| Cobalt Acetate Solution (4% water on olefin) | 340 | 20 | 1.4 |
| Cobalt Carbonate (solid) | 350 | 5 | 0.5 |
| Cobalt Oxalate (solid) | 350 | 5 | 0.5 |
| Cobalt Formate, basic (solid) | 350 | 5 | 0.5 |
| Cobalt Oxide | 350 | 4–5 | 0.7 |
| Cobalt Metal | 350 | 4–7 | 0.3 |
| Cobalt Sulfate (solid) ($7H_2O$) | 350 | <5 | 0.7 |

These data show clearly that the reaction rates obtainable with the solid cobalt acetate are nearly equivalent to the rates obtainable with cobalt oleate or cobalt carbonyl, the best known catalysts in activity. The data further show that this property is not shared by other cobalt solids by the simple exclusion of water. Neither do other low molecular weight cobalt salts, in the absence of water, show these high reaction rates.

The low reaction rates of the cobalt oxalate, carbonate, basic formate, oxide and metal are a direct result of the low rate of conversion of these solids to active catalyst, i. e., cobalt hydrocarbonyl. This low rate of conversion is apparently not caused by reaction inhibitors, for the induction periods are not greater than those experienced with cobalt oleate or acetate catalysts at equivalent conditions. It appears, thus, that solid cobalt acetate, and in particular the tetrahydrate is unique in its ease of conversion to active catalyst.

The process of the invention admits of numerous modifications apparent to those skilled in the art. Thus, it may be desirable under certain circumstances to incorporate the solid cobalt salt into a paste with liquid petrolatum, wax, and the like. Also, the catalyst slurry may be prepared in batch as well as continuous operation.

What is claimed is:

1. In the process wherein an olefinic compound is reacted with $H_2$, CO, and a cobalt catalyst at elevated pressures and temperatures in a reaction zone to produce an aldehyde compound containing one more carbon atom than said olefinic compound, and said aldehyde is subsequently hydrogenated to an alcohol product in a hydrogenation zone, the improvement which comprises employing as the catalyst in said first named reaction zone solid cobalt acetate.

2. The process of claim 1 wherein said catalyst is a hydrated cobalt acetate.

3. The process of claim 2 wherein said catalyst is cobalt acetate tetrahydrate.

4. The process of claim 1 wherein said cobalt acetate is passed to said first named zone slurried in olefin feed.

5. The process of claim 1 wherein said cobalt acetate is passed to said first named zone slurried in reaction product.

6. The process of claim 1 wherein said cobalt acetate is passed to said first named zone as a paste in hydrocarbonaceous material.

7. A method in accordance with claim 1 wherein the aldehyde produced is contaminated with cobalt, which further comprises treating said cobalt contaminated aldehyde product with added dilute acetic acid, recovering an aqueous solution of cobalt acetate, evaporating said solution to dryness and employing said recovered solid cobalt acetate as the catalyst in said first named reaction zone.

8. The process of claim 7 wherein said cobalt contaminated aldehyde solution is degassed prior to decobalting.

References Cited in the file of this patent

UNITED STATES PATENTS

| | | |
|---|---|---|
| 2,564,104 | Gresham et al. | Aug. 14, 1951 |
| 2,564,130 | Schreyer | Aug. 14, 1951 |
| 2,576,113 | Hagemeyer | Nov. 27, 1951 |
| 2,614,107 | Wender et al. | Oct. 14, 1952 |
| 2,640,074 | Gresham et al. | May 26, 1953 |
| 2,641,613 | Mertzweiller | June 9, 1953 |
| 2,647,149 | Condit et al. | July 28, 1953 |
| 2,695,315 | Parker | Nov. 23, 1954 |
| 2,701,816 | Buchner | Feb. 8, 1955 |

FOREIGN PATENTS

| | | |
|---|---|---|
| 651,144 | Great Britain | Mar. 14, 1951 |
| 667,093 | Great Britain | Feb. 27, 1952 |
| 679,664 | Great Britain | Sept. 24, 1952 |